United States Patent
Linden et al.

(10) Patent No.: US 11,288,759 B1
(45) Date of Patent: Mar. 29, 2022

(54) SYSTEMS AND METHODS TO PROVIDE SHARING OF BENEFITS AMONGST A GROUP OF USERS BASED ON GAINS FROM DISTRIBUTION RIGHTS PERTAINING TO DIGITAL ASSETS

(71) Applicant: Mythical, Inc., Sherman Oaks, CA (US)

(72) Inventors: John Linden, Sherman Oaks, CA (US); Rudy Koch, Sammamish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/150,242

(22) Filed: Jan. 15, 2021

(51) Int. Cl.
| | |
|---|---|
| *G06Q 20/00* | (2012.01) |
| *G06Q 50/18* | (2012.01) |
| *A63F 13/79* | (2014.01) |
| *G06Q 40/00* | (2012.01) |
| *A63F 13/00* | (2014.01) |
| *H04L 9/06* | (2006.01) |
| *G06F 21/10* | (2013.01) |
| *G06F 16/23* | (2019.01) |

(52) U.S. Cl.
CPC .......... *G06Q 50/184* (2013.01); *A63F 13/00* (2013.01); *A63F 13/79* (2014.09); *G06F 16/23* (2019.01); *G06F 21/10* (2013.01); *G06Q 40/12* (2013.12); *H04L 9/0618* (2013.01); *G06F 2221/0779* (2013.01)

(58) Field of Classification Search
CPC ...... G06Q 50/184; G06Q 40/12; A63F 13/00; A63F 13/79; G06F 16/23; G06F 21/10; G06F 2221/0779; H04L 9/0618

USPC .......... 705/16, 21, 59; 380/44, 262
See application file for complete search history.

(56) References Cited

U.S. PATENT DOCUMENTS

| | | |
|---|---|---|
| 9,452,356 B1 | 9/2016 | Tsao |
| 10,765,948 B2 | 9/2020 | Eatedali |
| 11,192,036 B1 | 12/2021 | Koch |
| 2005/0137015 A1 | 6/2005 | Rogers |

(Continued)

FOREIGN PATENT DOCUMENTS

WO WO-2020247002 A1 * 12/2020 ......... G06Q 20/3829

OTHER PUBLICATIONS

Examiner has furnished the Foreign Document (Year: 2020).*

(Continued)

*Primary Examiner* — Dante Ravetti
(74) *Attorney, Agent, or Firm* — Esplin & Associates, PC

(57) ABSTRACT

Systems and methods to provide sharing of benefits amongst a group of users are disclosed. Exemplary implementations may: effectuate a presentation of an agreement interface for the users to define and/or join group agreements; generate, based on the group agreements, sets of instructions for implementation of the group agreements; transmit the sets of instructions to a decentralized ledger server; receive and executing the transmitted sets of instructions to record the group agreements on the blockchain as smart contracts; record transactions pertaining to the digital assets; responsive to recording the transactions, increase the group account balances by a portion of the earned gains resultant from the recorded transactions; and responsive to an occurrence of at least one of the trigger events specified for the first group agreement, allocate a portion of the group account balance to the group of users.

20 Claims, 5 Drawing Sheets

(56) References Cited

U.S. PATENT DOCUMENTS

| | | |
|---|---|---|
| 2006/0100006 A1 | 5/2006 | Mitchell |
| 2006/0190392 A1 | 8/2006 | Samid |
| 2007/0099685 A1 | 5/2007 | Van Luchene |
| 2007/0202951 A1 | 8/2007 | Bogosian |
| 2009/0318221 A1 | 12/2009 | Dhunjishaw |
| 2009/0325690 A1 | 12/2009 | Zhou |
| 2010/0205430 A1 | 8/2010 | Chiou |
| 2011/0183749 A1 | 7/2011 | Allen |
| 2011/0312424 A1 | 12/2011 | Burckart |
| 2013/0172086 A1 | 7/2013 | Ikenaga |
| 2014/0011595 A1 | 1/2014 | Muller |
| 2014/0162781 A1 | 6/2014 | Butler |
| 2015/0224409 A1 | 8/2015 | Hayashida |
| 2015/0375103 A1 | 12/2015 | George |
| 2016/0005270 A1 | 1/2016 | Marr |
| 2017/0095741 A1 | 4/2017 | Perry |
| 2018/0178125 A1 | 6/2018 | Perry |
| 2020/0090143 A1 | 3/2020 | Iervolino |
| 2020/0202668 A1 | 6/2020 | Cotta |
| 2020/0294133 A1 | 9/2020 | Cella |
| 2020/0311721 A1 | 10/2020 | Ow |
| 2021/0052981 A1* | 2/2021 | Yi .......................... A63F 13/35 |
| 2021/0106920 A1 | 4/2021 | Lim |

OTHER PUBLICATIONS

Reference N—Kumar Reference (Year: 2019).*

Rockstarflipper, "Ebay for Beginners, Episode #5. Top Rated Seller & Feedback"—(https://www.youtube.com/watch?v= 6tk9sZ95ZW8), Mar. 19, 2017 (Year: 2017).

Wood, Mike, "Howto Leave Feedback on Ebay",—(https://www.youtube.com/watch?v=ElY1uTuAixA), May 25, 2017 (Year: 2017).

Rockstarflipper, "Ebay for Beginners, Episode #5. Top Rated Seller & Feedback"—(https://www.youtube.com/watch7v6tk9sZ95ZW8), Mar. 19, 2017 (Year: 2017).

Wood, Mike, "How to Leave Feedback on Ebay"—(https://www.youtube.com/watch? v=ElYiuTuAixA),May 25, 2017 (Year: 2017).

\* cited by examiner

SYSTEMS AND METHODS TO PROVIDE SHARING OF BENEFITS AMONGST A GROUP OF USERS BASED ON GAINS FROM DISTRIBUTION RIGHTS PERTAINING TO DIGITAL ASSETS

CROSS-REFERENCE TO RELATED APPLICATIONS

The present application is related to U.S. Patent Nonprovisional Application No. 17/185,740 entitled "SYSTEMS AND METHODS TO ENABLE ADMINISTRATORS TO INCENTIVIZE IN-GAME USER BEHAVIORS AND IN-GAME USER ACTIVITIES VIA GROUP AGREEMENTS THAT GOVERN USER GROUPS WITHIN AN ONLINE GAME", filed Feb. 25, 2021, the contents of which are incorporated herein by reference in their entirety.

FIELD OF THE DISCLOSURE

The present disclosure relates to systems and methods to provide sharing of benefits amongst a group of users based on gains from distribution rights pertaining to digital assets.

BACKGROUND

Online gaming platforms are known. Users of online gaming platforms exchanging digital in-game assets to other users is known. Distributed ledgers are known techniques to produce a secure record or registry of ownership of assets, transactions, and other information. For example, a distributed blockchain is a distributed ledger.

SUMMARY

One aspect of the present disclosure relates to a system configured to provide sharing of benefits amongst a group of users based on gains from distribution rights pertaining to digital assets. The system may include an online gaming platform and a decentralized ledger server that comprise one or more hardware processors configured by machine-readable instructions. The online gaming platform may be configured to host one or more games. The online gaming platform may include a game component, a group component, and/or other instruction components.

The decentralized ledger server may include a rights component, an instructions component, a transaction recording component, a group balance component, a benefit allocation component, and/or other instruction components.

The game component may be configured to execute, via the online gaming platform, an instance of a game. The instance of the game may facilitate presentation of the game to users, and implement in-game actions in the instance of the game in response to action requests for the in-game actions by the users. The presentation of the game may be based on views of the game that are determined during execution of the game. By way of non-limiting illustration, the users may include a first user and a second user that interact with the online gaming platform.

The group agreement component may be configured to effectuate, via the online gaming platform, presentation of an agreement interface. The agreement interaction may enable the users to define and/or join group agreements with two or more participating ones of the users. The users that may participate in the group agreements agree to (i) contribute future gains to group account balances associated with individual ones of the group agreements, and (ii) the users that may participate in the group agreements share a future allocation of benefits. The future gains that will be contributed to the group may account balances are associated with particular digital assets. Sharing of the future allocation of the benefits may include at least a portion of the group account balances. By way of non-limiting illustration, the group agreements may include a first group agreement. The first user and the second user may join the first group agreement via the agreement interface. The first group agreement may be associated with a first group account balance.

The group agreement component may be configured to generate, based on the group agreements, sets of instructions for implementation of the group agreements as smart contracts. The group agreement component may be configured to transmit the sets of instructions to a decentralized ledger server.

The rights component may be configured to record, on a blockchain implemented by the decentralized ledger server, rights pertaining to digital assets. The recorded rights may include ownership rights of digital assets that reflect ownership of the digital assets by individual ones of the users. By way of non-limiting illustration, the recorded rights reflect at least a first ownership of a first digital asset by the first user and a second ownership of a second digital asset by the second user. The first digital asset and the second digital asset may be not fungible, may be usable within the online gaming platform, and may represent three-dimensional in-game user-controllable characters that can interact with other virtual items within the online gaming platform.

The recorded rights may further include distribution rights of digital assets. The distribution rights may reflect rights held by the individual ones of the users to certain distributions of benefits upon exchanges involving the particular digital assets. By way of non-limiting illustration, a first distribution right for the first digital asset may be owned by the first user and a second distribution right for the second digital asset may be owned by the second user. The ownership of the digital assets may be recorded separately from ownership of the distribution rights of the digital assets. The rights component may be configured to receive instructions to modify the recorded rights.

The instructions component may be configured to receive and executing the sets of instructions to record the group agreements on the blockchain as the smart contracts. The group agreements may specify the participating users in the group agreements and further specify trigger events. The trigger events may cause execution of the sharing of the future allocation of the benefits. By way of non-limiting illustration, the group agreements as received may include the first group agreement.

The transaction recording component may be configured to record, on the blockchain, transactions pertaining to the digital assets. The transactions may result in gains based on the ownership of the distribution rights of the digital assets. By way of non-limiting illustration, a first transaction pertaining to the first digital asset may be recorded. The first user may earn a first gain based on owning the first distribution rights.

The group balance component may be configured to increase the group account balances by a portion of the earned gains resultant from the recorded transactions. The increase to the group account balances may be responsive to the transactions being recorded. By way of non-limiting illustration, the first gain may increase the first group account balance associated with the first group agreement.

The benefit allocation component may be configured to share an allocation of a portion of the group account balances with the users participating in the associated group agreement. The sharing of the allocation may be responsive to an occurrence of at least one of the trigger events specified for the group agreement. By way of non-limiting illustration, responsive to an occurrence of at least one of the trigger events specified for the first group agreement, the first user and the second user may share an allocation of a portion of the first group account balance.

As used herein, any association (or relation, or reflection, or indication, or correspondency) involving servers, processors, client computing platforms, assets, requests, exchanges, offers, transactions, in-game actions, rights, benefits, ownership, users, metrics, metric values, scores, gains, trigger events, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
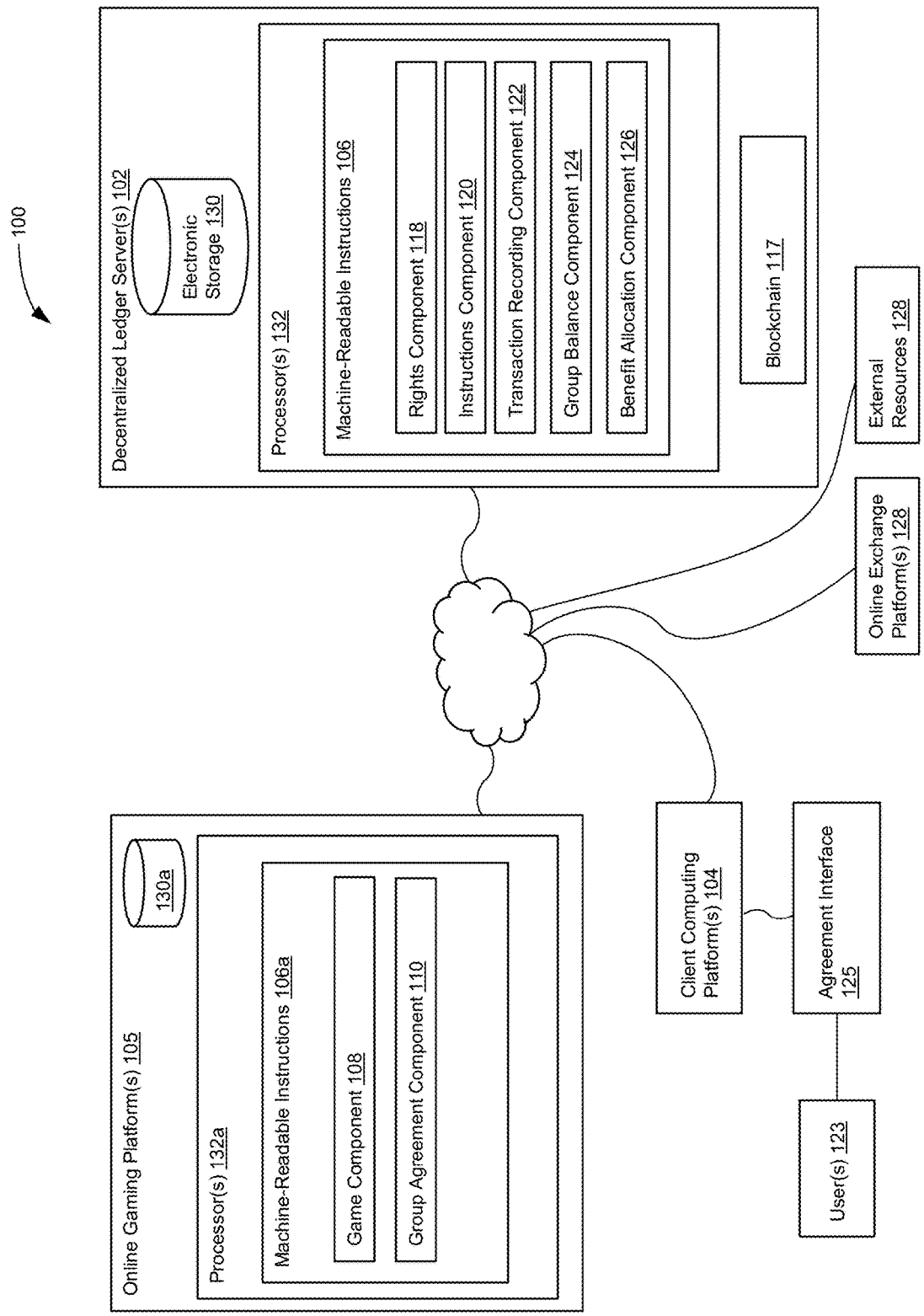
FIG. 1 illustrates a system configured to provide sharing of benefits amongst a group of users based on gains from distribution rights pertaining to digital assets, in accordance with one or more implementations.

FIG. 1 illustrates a system 100 configured to provide sharing of benefits amongst a group of users based on gains from distribution rights pertaining to digital assets, in accordance with one or more implementations. In some implementations, system 100 may be configured to record rights, record transactions, execute instructions, and/or other actions pertaining to the digital assets on a blockchain 117 implemented by a decentralized ledger server 102. In some implementations, the digital assets may include and/or be virtual items that are not fungible and may be usable within an online gaming platform 105. In some implementations, the digital assets may represent three-dimensional in-game user-controllable characters that can interact with other virtual items within online gaming platform 105.

By way of non-limiting example, digital assets may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within gaming platform 105 that a user may use, own, sell, trade, destroy, and/or otherwise effectuate a change of ownership of.

As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual CryptoKitty™ may be a non-fungible digital asset. A digital asset may be semi-fungible if there is a set of a limited number of similar but distinguishable digital assets. For example, a limited-edition Blanko™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets.

In some implementations, digital assets may be usable within one or more games. Online gaming platform 105 may be configured to host the one or more games. Instances of the games may be executed within one or more online gaming platforms 105. As used herein, online gaming platform 105 may refer to either an individual game (e.g., an interactive online game), a type of gaming console and its ecosystem, and/or both. Online gaming platform 105 may be operated, hosted, and/or owned by one or more stakeholders of online gaming platform 105. For example, a platform operator (and/or another stakeholder) may sell in-game digital assets (e.g., characters, weapons, resources, etc.) to users 123 of online gaming platform 105. However, such a sale is not a player-to-player exchange. As used herein, exchanges may refer to player-to-player actions that facilitate individual players to auction, sell, purchase, trade, barter, and/or otherwise exchange digital assets. In other words, individual players may own individual virtual items, and exchange these items with other individual players. Due to an exchange, ownership of a digital asset transitions from an original owner to a new owner (even if there may, in some implementations, be one or more intermediary and/or temporary owners during the process of performing the exchange).

In some implementations, system 100 may include one or more decentralized ledger servers 102, one or more online gaming platform(s) 105, electronic storage 130 of decentralized ledger server(s) 102, electronic storage 130a of online gaming platform(s) 105, one or more client computing platform(s) 104, one or more agreement interfaces 125, one or more external resources 128, and/or other components. Users 123 (also referred to as players) may include one or more of a first user, a second user, a third user, a fourth user, and/or other users. As used in descriptions herein, any use of the term "user" may refer to user(s) 123.

Online gaming platform(s) 105 may be configured to communicate with one or more client computing platforms 104 according to a client/server architecture and/or other architectures. Client computing platform(s) 104 may be configured to communicate with other client computing platforms via online gaming platform(s) 105 and/or according to a peer-to-peer architecture and/or other architectures. Users may access system 100 via client computing platform(s) 104.

In some implementations, system 100 and/or decentralized ledger server(s) 102 may be configured to communicate with one or more of online gaming platform(s) 105, decentralized ledger server(s) 102, users 123, and/or other components. Users 123 may include players who play and/or otherwise interact on online gaming platform 105.

Online gaming platform(s) 105 may include one or more of electronic storage 130a, server(s) (not depicted in FIG. 1), processor(s) 132a, machine-readable instructions 106a, and/or other components. Electronic storage 130a may be similar to electronic storage 130 as described elsewhere in this disclosure, though included in online gaming platforms 105. Processor(s) 132a may be similar to processor(s) 132 as described elsewhere in this disclosure, though included in online gaming platforms 105. Machine-readable instructions 106a may be similar to machine-readable instructions 106 as described elsewhere in this disclosure, though included in online gaming platforms 105. Processor(s) 132a may be configured by machine-readable instructions 106a. Machine-readable instructions 106a may include one or more instruction components. The instruction components may include computer program components. The instruction components may include one or more of a game component 108, a group agreement component 110, and/or other instruction components.

Decentralized ledger server(s) 102 may include one or more of electronic storage 130, processor(s) 132, machine-readable instructions 106, blockchain 117, and/or other components. Processor(s) 132 may be configured by machine-readable instructions 106. Machine-readable instructions 106 may include one or more instruction components. The instruction components may include computer program components. The instruction components may include one or more of a rights component 118, an instructions component 120, a transaction recording component 122, a group balance component 124, a benefit allocation component 126, and/or other instruction components.

In some implementations, blockchain 117 may be maintained by a distributed computing platform (not shown in FIG. 1). In some implementations, the distributed computing platform may be implemented by a set of client computing platforms and/or servers (including, for example, one or more decentralized ledger servers 102). The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 117. The smart contracts may be stored on blockchain 117. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Game component 108 may be configured to execute, via online gaming platform 105, an instance of a game. The instance of the game may facilitate presentation of the game to users 123. For example, the instance of the game may be an online game executed with online gaming platform 105. Game component 108 may be configured to implement in-game actions in the instance of the game in response to action requests for the in-game actions by the users. In some implementations, game component 108 may be arranged, organized, and/or otherwise included in online gaming platform 105. As used herein, the term "game" may refer to one or more games within gaming platform 105. In some implementations, the game may be provided via a virtual space, and may include a plurality of resource types and/or maps.

The presentation of the game may be based on the views of the game that are determined during execution of the game. In some implementations, the view may be communicated (e.g., by streaming, via object/position data, and/or other information) from decentralized ledger server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. By way of non-limiting illustration, users 123 may include the first user and the second user that interact with online gaming platform 105. The first user and the second user may control digital assets (e.g., characters) in a game hosted by online gaming platform 105. In some implementations, user inventories may be managed using blockchain 117. For example, ownership of individual virtual items included in an individual user inventory may be recorded on blockchain 117. In some implementations, individual user inventories may correspond to individual smart contracts stored on blockchain 117.

Group agreement component 110 may be configured to effectuate presentation of an agreement interface 125. In some implementations, agreement interface 125 may be presented via online gaming platform 105. In some implementations, agreement interface 125 may be presented via client computing platforms 104. In some implementations, agreement interface 125 may enable the users to define group agreements to be formed, e.g., with two or more participating ones of the users. In some implementations, agreement interface 125 may enable the users to join previously formed group agreements. The participating users in individual ones of the group agreements may include, by way of non-limiting example, designers, creators, artists, brands, companies, and/or other users.

In some implementations, the users that participate in the group agreements may agree (and/or commit) to contribute future gains and/or benefits to group account balances associated with individual ones of the group agreements. In some implementations, group agreements may commit distribution gains to group account balances associated with particular user groups. In some implementations, group agreements may disperse the group account balances to particular users within particular user groups. The future gains and/or benefits that will be contributed to the group account balances may be associated with particular digital assets. For example, particular gains and/or benefits may be asset-specific. The gains may include one or more virtual currencies such as virtual tokens, virtual stars, virtual points, virtual real-world currencies (e.g., US Dollars (USD)), and/or other gains that are based on the particular digital assets. The group account balances may refer to a cumulation of the one or more virtual currencies that include the gains associated with the digital assets and thus associated with the users participating in the corresponding group agreements. In some implementations, a given group account balance may accumulate multiple of the virtual currencies. The one or more virtual currencies may be converted to another one of the virtual currencies. For example, the given group account balance may accumulate USD and virtual points, and the virtual points may be converted to USD to contribute to the given group account balance.

Furthermore, the users that participate in the group agreements may agree and/or commit to share a future allocation and/or dispersion of benefits (and/or group account balances). For example, sharing of the future allocation of the benefits may include at least a portion of the group account balances that the users participating contribute to. In some implementations, the allocation of the benefits may be determined for the individual users participating in the group agreement (e.g., as described elsewhere in regard to benefit allocation component 126). In some implementations, determining the allocation of the benefits (that is, the portion of a particular group account balance) for the individual users may be based on the gains contributed to the particular group account balance by the individual participating users, time spent on online gaming platform 105 by the individual participating users, progress within the game by (or attributable to) the individual participating users, damage done to another digital asset by using the digital asset, victory within the game by the individual participating users, contribution to a goal of the individual participating users, and/or information. In some implementations, determining the allocations and/or dispersions of the benefits for the individual users may include dividing the group account balance evenly between the users participating in the group agreement. In some implementations, determining the allocations and/or dispersions of the benefits for the individual users may include dividing the group account balance proportionally (based on contributions) between the users participating in the group agreement.

By way of non-limiting illustration, the group agreements may include a first group agreement, a second group agreement, a third group agreement, and so forth. The first user and the second user may join the first group agreement via agreement interface 125. For example, in some implementations, users may accept a particular group agreement. For example, in some implementations, agreement interface 125 may receive indications of acceptance from particular users to form and/or join a particular group agreement. The first group agreement may be associated with a first group account balance. Future (distribution) gains associated with one or more particular digital assets of the first user and one or more particular digital assets of the second user may be used (at least in part) to contribute to the first group account balance. In some implementations, the first group agreement may commit particular (distribution) gains to the first group account balance.

Group agreement component 110 may be configured to generate sets of instructions for implementation and/or usage of the group agreements as smart contracts. Group agreement component 110 may be configured to transmit the sets of instructions to decentralized ledger server 102 (e.g., to instructions component 120) for execution. In some implementations, the smart contracts may be added to blockchain 117 implemented by decentralized ledger server 102. For example, a blockchain, such as blockchain 117, is a type of ledger, as well as a type of decentralized database that records rights pertaining to digital assets, transactions, and/or other information.

Rights component 118 may be configured to record rights pertaining to digital assets. The rights pertaining to the digital assets may be recorded on blockchain 117 implemented by decentralized ledger server 102. The recorded rights may include ownership rights of digital assets, distribution rights of digital assets, other rights pertaining to digital assets, and/or other information. The ownership rights may reflect ownership of the digital assets by individual ones of the users. By way of non-limiting illustration, the recorded rights may reflect at least a first ownership of a first digital asset by the first user, a second ownership of a second digital asset by the second user, and so forth. The first digital asset and the second digital asset may be not fungible and may be usable within online gaming platform 105. The first and second digital assets may represent three-dimensional in-game user-controllable characters that can interact with other virtual items within online gaming platform 105. For example, the particular digital asset may be a wizard that the first user can use within a particular online gaming platform 105. Ownership right of the wizard within the particular online gaming platform 105 enables the first user holding the ownership right to use the wizard in gameplay. In other words, (at least some type of) ownership may correspond to usage rights. For example, ownership of the usage right may be represented by including and/or presenting the wizard in the inventory of the first user (and not in the inventories of other players).

The distribution rights of digital assets may reflect rights held by the individual ones of the users to receive certain distributions of benefits upon exchanges involving the particular digital assets. That is, the individual users may own/hold rights to particular digital assets that guarantee them benefits upon (future) exchanges involving those digital assets regardless of whether the individual users owns/hold the ownership rights for those digital assets. In some implementations, the benefits may result from a particular action or activity (such as, e.g., a sale of a particular digital asset), e.g., within online gaming platform 105, of the particular digital asset. As used herein, a benefit resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the users that hold the distribution rights) receive something of value and/or use.

For example, a distribution right of a druid within online gaming platform 105 signifies that a particular user, for example, holding the distribution right to the druid (e.g., the particular user may be the designer of this druid character) is entitled to benefits that result from a future exchange involving the druid (e.g., a sale between players, even if this sale occurs between two players other than the particular player) within online gaming platform 105.

For example, in some implementations, the distribution rights may guarantee a gain resulting from selling, e.g., within online gaming platform 105, of the druid. For example, in some implementations, distribution rights may guarantee a gain resulting from (certain types of) use, within online gaming platform 105, of the druid. For example, once the druid is sold within online gaming platform 105, the holder of the distribution rights (i.e., the particular user), may receive a certain portion resulting from this sale, as defined by the distribution right. For example, once the druid is exchanged or traded within online gaming platform 105, the particular user may receive a certain portion as defined by a particular distribution right. For example, once the druid is used within online gaming platform 105 to create wealth and/or other profits, the particular user may receive a certain portion as defined by the particular distribution right. In some implementations, for example, the distribution right may define the portion as a certain percentage of the proceeds and/or profit. The certain percentage may be 1%, 2%, 3%, 4%, 5%, 10%, 15%, 20%, 25%, and/or another percentage. In some implementations, for example, the particular distribution right may define the portion as a fixed fee and/or minimum fee of a certain amount. In some implementations, for example, the distribution right may define the portion as a combination of a fee and a percentage, according to some arrangement for payment. In some implementations, ownership of the druid, distribution rights of the druid, and/or one or more other rights pertaining to the druid may be recorded, e.g., on a blockchain. In some implementations, a particular digital asset (which may be recorded on a blockchain) may correspond to multiple distribution rights that may be held by multiple beneficiaries/users. For example, a portion resulting from a particular action or activity may be split in any way among multiple beneficiaries.

Instructions component 120 may be configured to receive instructions to modify the recorded rights. In some implementations, instructions component 120 may be configured to receive instructions to modify the rights recorded on blockchain 117. The recorded rights may be modified responsive to a sale of a given digital asset that modifies the ownership right, an exchange of digital assets between players that modifies the ownership rights, a transfer of ownership rights to the individual digital assets, a sale or other transfer of distribution rights to the individual digital assets, a transfer of distribution rights pertaining to the individual digital assets, and/or other transactions. In some implementations, instructions component 120 may be configured to provide received instructions to rights component 118 for execution.

Instructions component 120 may be configured to receive and execute the sets of instructions to record the group agreements on blockchain 117 as the smart contracts. In some implementations, once a smart contract has been added to a blockchain, the smart contract may be referred to as published, posted, registered, and/or recorded. The sets of instructions may be generated based on the group agreements. As such, the group agreements as received may include the first group agreement, the second group agreement, and so forth. The group agreements may specify the participating users in the group agreements, trigger events, and/or other information. In some implementations, the trigger events may cause execution of the sharing of the future allocation of the benefits. In some implementations, the trigger events may cause execution of the distribution of benefits to participating users. The trigger events may determine a time that the participating users are distributed the future allocation of the benefits. By way of non-limiting example, the trigger events may include recorded transactions (by transaction recording component 122), particular ones of the recorded transactions, a particular amount of the transactions, a particular amount of a given transaction (e.g., 10 exchanges of digital assets), the group account balance reaching a predefined amount, a reoccurring a predefined time (e.g., every 15th day of a month), and/or other trigger events. In some implementations, the users participating in the group agreements may define and/or modify the trigger events to cause the sharing of a corresponding group account balance. The predefined amount to be reached by the group account balance may be defined by the users participating in that group agreement, an administrator of online gaming platform 105, fixed by online gaming platform 105, or by other definitions. Likewise, the predefined time may be defined by similar techniques as the predefined amount to be reached by the group account balance.

Transaction recording component 122 may be configured to record transactions pertaining to the digital assets. The transactions may be recorded on blockchain 117. In some implementations, the transactions may be responsive to one or more of in-game victories resulting from uses of the digital assets in missions, assignments, chapters, tasks, mini-games, and/or other competitions; the in-game actions executed by the digital assets that are controlled by a user participating in the group agreements; sales of the digital assets; loans of the digital assets; sales of accessories associated with the digital assets such as weapons, hats, shoes, clothing, etc.; loans of the accessories associated with the digital assets, and/or other in-game actions or exchanges.

The transactions may result in gains based on the ownership of the distribution rights of the digital assets. That is, the users that own the distribution rights to digital assets that, e.g., won mini-games, may gain some proceeds from those mini-game victories. As previously described, the gains may include virtual tokens, virtual stars, virtual points, virtual real-world currencies (e.g., US Dollars (USD)), and/or other gains. By way of non-limiting illustration, a first transaction pertaining to the first digital asset may be recorded. Thus, the first user may earn a first gain, e.g., $50, based on owning the first distribution rights. In some implementations, the first gain may be a portion of proceeds from the first transaction.

Elements of blockchain 117 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain 117 may be publicly accessible and append-only. In some implementations, existing blocks of blockchain 117 can substantially not be altered or deleted, unless multiple copies are altered. This is unlikely to happen provided that the multiple copies stored on different computing platforms, e.g., in different geographical locations. Blockchain 117 may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Group balance component 124 may be configured to increase the group account balances by a portion of the earned gains resultant from the recorded transactions (e.g., the particular recorded transactions that fall within group agreements). The increase to the group account balances may be responsive to the transactions being recorded. In some implementations, the portion of the earned gains that may increase the group account balances may be predefined by the individual group agreements associated with the group account balances, online gaming platform 105, a particular user (e.g., an administrative user of online gaming platform 105), and/or determined in another manner. In some implementations, for example, the portion of the earned gains may be a certain percentage of the proceeds and/or profit the users earned. The certain percentage may be 1%, 2%, 3%, 4%, 5%, 10%, 15%, 20%, 25%, and/or another percentage. In some implementations, for example, the portion may be a fixed amount of the gains and/or minimum fee of a certain amount. In some implementations, for example, the portion may be a combination of a fee and a percentage, according to some arrangement for contribution to increase the group account balance. In some implementations, only a part of the portion (of the earned gains) may be contributed to increase the group balance. In some implementations, the part of the portion that increases the group account balances may be modifiable by the user participating and earning the gains and/or the administrative user. In some implementations, the part of the portion that increases the group account balances may be fixed. In some implementations, the part of the portion that increases the group account balances may be specific to individual ones of the participating users. The individual users may specify the part of the portion of their gain from the transaction that will contribute and thus increase the group account balance. Nonetheless, the portion of the earned gains, or the part of that portion, that increases the group balances may be defined in the group agreements.

By way of non-limiting illustration, a first gain (resultant from a particular recorded transaction of the first digital asset), e.g., a gain of $50, may be used to increase the first group account balance associated with the first group agreement. For example, in some implementations, the first user may specify to contribute all (future) gains to the first account balance, e.g., the $50. For example, in some implementations, a portion of the first gain, e.g., 10% of the $50, may increase the first group account balance. The 10% of the first gain may have been specified by the first user and included in the first group agreement (prior to occurrence of the particular recorded transaction). Responsive to a second transaction pertaining to the first digital asset being recorded (by transaction recording component 122) and the first user earning a second gain based on owning the first distribution rights, the first group account balance may further be increased by a second portion of the second gain.

Benefit allocation component 126 may be configured to share an allocation of a portion of the group account balances (associated with the individual group agreements) with the users participating in the group agreements. In some implementations, benefit allocation component 126 may be configured to distribute a portion of a group account balance to the users participating in a group agreement. The allocations and/or distributions for the users participating may be shared responsive to an occurrence of at least one of the trigger events specified for the individual group agreements. In some implementations, allocations and/or distributions to the participating users may occur at times and/or moments as previously agreed upon by the participating users.

In some implementations, the execution of the sharing of the future allocations of the benefits may include a determination of individual allocations that are shared with the participating users. The individual allocations may be determined prior to the sharing of the allocations. In some implementations, the individual allocations may be individually determined portions of the group account balance.

That is, an allocation, i.e., a portion of the group account balance, may be determined for each of the individual users participating in the group agreement that corresponds to that group account balance. In some implementations, the allocation shared may be based on the gains (or portion thereof) contributed to the group account balance by the individual participating users, time spent on the online gaming platform by the individual participating users, progress within the game (e.g., leveling up, achievements of task and/or assignments, etc.) by the individual participating users, damage done to another digital asset, victory within the game, contribution to a goal of the participating users of the group agreement, and/or other information.

In some implementations, the progress made within the game may be attributable to the particular digital assets that are being controlled and owned by a current user. In some implementations, the damage done to another digital asset may be attributable to the particular digital assets that are being controlled and owned by the current user. In some implementations, the victory within the game may be a victory for the digital assets by way of control by the current user. In some implementations, the users participating in the individual group agreements may define a goal amongst themselves. Contribution to achieving the goal may be a basis in the determination of the allocation shared with the participating users.

In some implementations, the allocation shared may be determined by evenly dividing the group account balance amongst the participating users. For example, upon four of the users participating in a given group agreement, a group account balance associated with the given group agreement may be split and allocated in four equal parts.

By way of non-limiting illustration, responsive to an occurrence of at least one of the trigger events specified for the first group agreement, the first user and the second user may share an allocation of a portion of the first group account balance. For example, a first allocation may be shared with the first user and a second allocation may be shared with the second user. In some implementations, upon determining the first allocation and the second allocation based on, e.g., the gains they individually contributed to the first group account balance and/or their individual progress within the game, the first allocation may be different than the second allocation. In some implementations, the first allocation and the second allocation may be equal upon the first group account balance being equally divided amongst the first user and the second user.

Figure 3A:
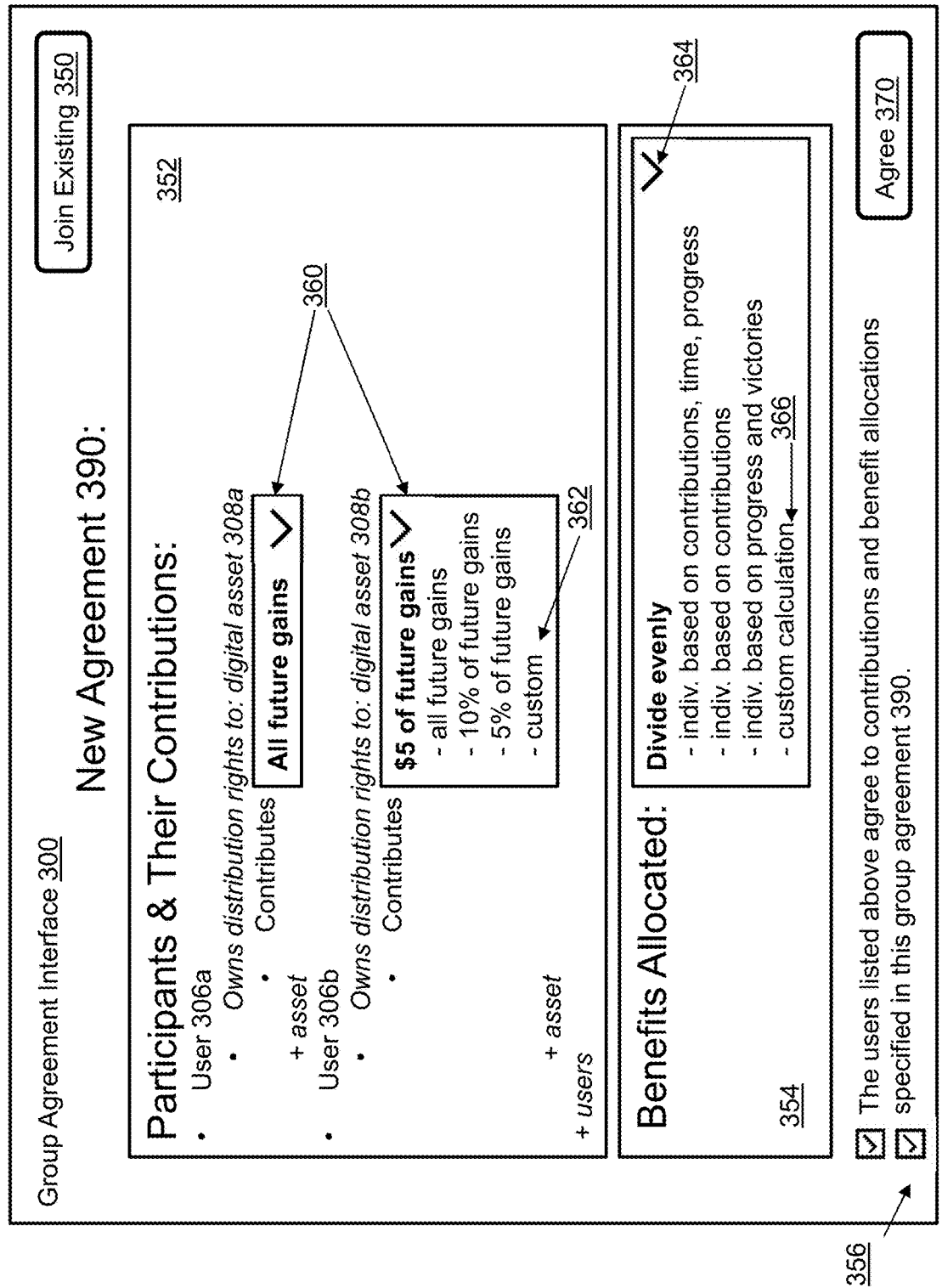
FIGS. 3A-3B illustrate example implementations of an agreement interface as may be used by a system configured to provide sharing of benefits amongst a group of users based on gains from distribution rights pertaining to digital assets, in accordance with one or more implementations.
Figure 3B:
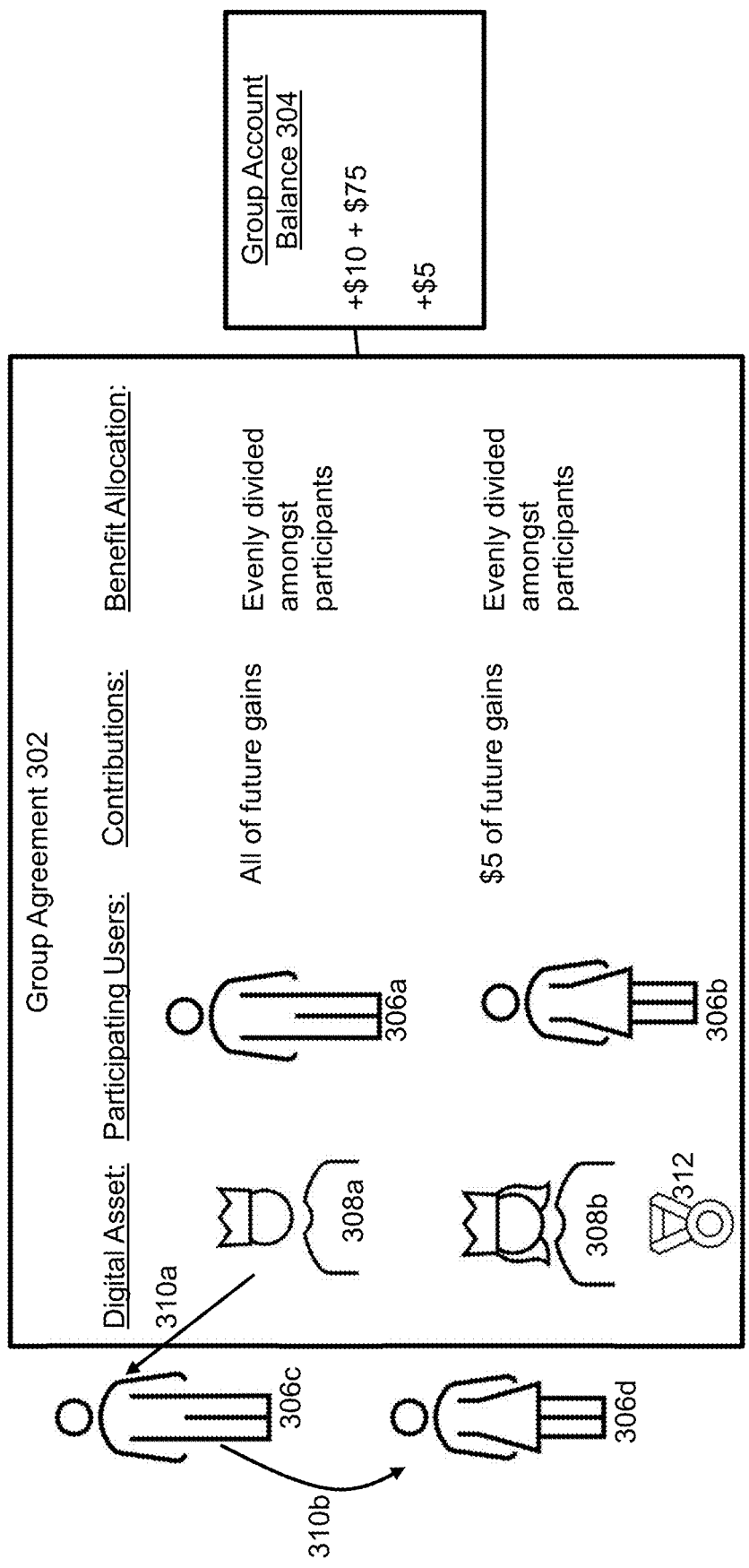

FIG. 3A-B illustrates an example implementation of an agreement interface as may be used by system 100, in accordance with one or more implementations. FIG. 3A may illustrate group agreement interface 300 that enables users to define group agreements with other users and/or join existing group agreements. Group agreement interface 300 may include a join button 350 where the users may view existing group agreement to join (not pictured). Group agreement interface 300 may include a participant/contribution section 352, a benefit allocation section 354, and a term section 356 to define and generate an agreement 390. Participant/contribution section 352 may enable the users (e.g., user 306a, user 306b) to specify users are participating in a group agreement. Furthermore, the users may specify digital asset(s) (that they own distribution rights) that they agree to contribute future gains of to a group account balance (e.g., by accepting the terms that define a particular group agreement). For individual ones of the specified digital assets, the users may specify a contribution to the group account balance from future gains of those digital assets. For example, user 306a may own distribution rights to a digital asset 308a and specify digital asset 308a in agreement 390. User 306a may agree and/or commit to contribute all future gains he earns from exchanges involving digital asset 308a. User 306b may own distribution rights to a digital asset 308b and specify digital asset 308b in agreement 390. User 306b may agree and/or commit to contribute $5 of future gains she earns from exchanges involving digital asset 308b. The contributions may be selected from dropdown menus 360 or defined upon selection of a custom option 362. Additional digital assets per user may be added and additional users may be added to agreement 390.

Benefit allocation section 354 may enable the users to specify how the group account balance is allocated and/or dispersed to users 306a and 306b. Benefit allocations and/or dispersions may be selected from a dropdown menu 364 or defined upon selection of a custom option 366. Upon completion of defining agreement 390 and acknowledged agreement and/or acceptance to terms section 356, one of users 306a and 306b may select agree button 370 to generate a set of instructions for implementation of agreement 390 as a smart contract on a blockchain (not pictured).

FIG. 3B may illustrate (usage of) group agreement interface 300 of FIG. 3A that depicts a group agreement 302 and a group account balance 304 associated with group agreement 302. Users 306a and 306b may be users participating in group agreement 302. User 306a may own the distribution right to a digital asset 308a and user 306b may own the distribution right to a digital asset 308b. Group agreement 302 may describe that user 306a agreed to contribution all their future gains resultant from exchanges involving digital asset 308a to group account balance 304. Group agreement 302 may describe that user 306b agreed to contribution $5 of their future gains resultant from (individual) exchanges involving digital asset 308b to group account balance 304. Furthermore, group agreement 302 may describe that users 306a and 306b agreed to share an allocation of benefits which is an even portion of group account balance 304.

Upon recordation of transactions 310a and 310b on a blockchain (not pictured) pertaining to a sale exchanges of digital asset 308a to a user 306c and subsequently to a user 306d, a portion of gains earned from such transactions, e.g., $10 and $7.50, may be contributed to group account balance 304 by user 306a. That is, based on transaction 310a where digital asset 308a was sold to user 306c for $100, 10% of gains from the sale (i.e., $10) may be contributed to group account balance 304 in accordance with group agreement 302. Based on transaction 310b where digital asset 308a was sold from user 306c to user 306d for $1500, user 306a may gain 5% (i.e., $75). Thus, the $75 gain may be contributed to group account balance 304 in accordance with group agreement 302.

Upon recordation of a transaction on a blockchain (not pictured) pertaining to a victory 312 by digital asset 308b in an online game (not pictured) wherein winner won $30, user 306a agreed via group agreement 302 to contribute $5 of the $30 to group account balance 304. Group agreement 302 may further specify a trigger event (e.g., end of each month) that executes sharing of allocations from group account balance 304. At the end of each month, allocations to users 306a and 306b may be determined by evenly dividing the group account balance 304 amongst them so that $45 is shared with each user 306a and 306b.

Figure 4A:
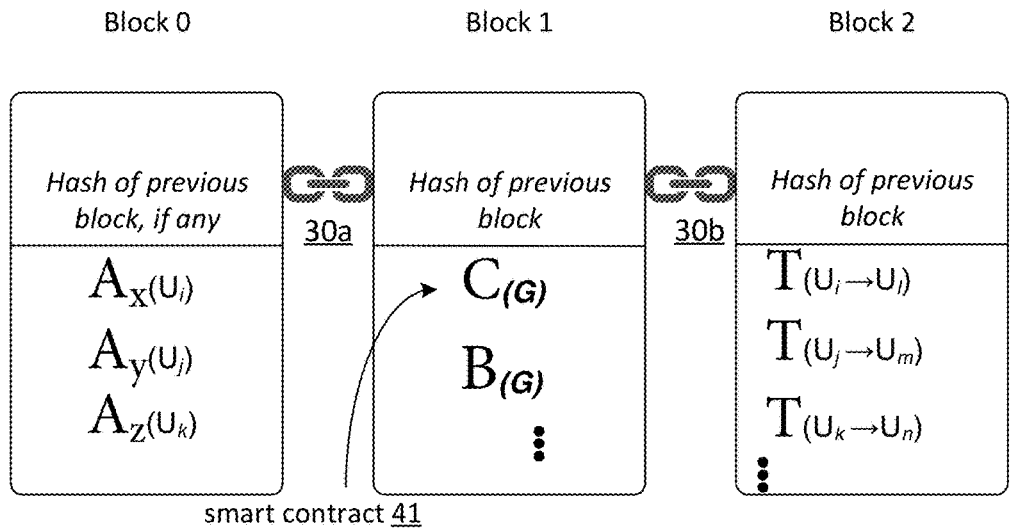
FIGS. 4A-4B illustrate exemplary blockchains as may be used by a system configured for operating a bridge server to support multiple shards of blockchains, in accordance with one or more implementations.
Figure 4B:
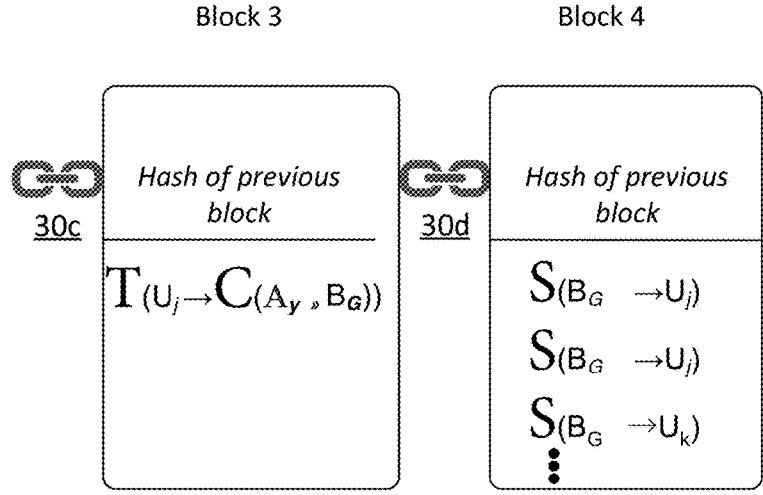

FIGS. 4A-4B illustrate exemplary blockchains as may be used by a system configured for operating a bridge server to support multiple shards of blockchains, in accordance with one or more implementations. FIG. 4A illustrates a blockchain 117a that includes a block 0, a block 1, and a block 2. As time progresses, more blocks may be added to blockchain 117A. The blocks within blockchain 117a are ordered. In block 0, three assets (indicated by a capital "A") are generated and/or assigned to three users or participants: a first digital asset, $A_x$, is assigned to user i ($U_i$), a second digital asset, $A_y$, is assigned to user j ($U_j$), and a third digital asset, $A_z$, is assigned to user k ($U_k$).

For example, the assets in block 0 may be individual distribution rights included in particular digital assets within an online gaming platform. Block 1 is connected to block 0 (as indicated by a link 30a), for example by including an address of block 1 in block 0, or vice versa. Likewise, block 1 is connected to block 2, as indicated by a link 30b.

In block 1, a smart contract 41 (indicated by a capital "C") is posted. For example, smart contract 41 may have been generated by a component similar to instructions component 120, and may have been posted to blockchain 117a by a component similar to instructions component 120 (shown in FIG. 1). Smart contract may define a group agreement G. In some implementations, a smart contract may be appended to a distributed blockchain as soon as both or all participants are known and/or agreed upon. In some implementations, a smart contract may be appended to a distributed blockchain as soon as all participants are known, the contributions of future gains, the future allocations of benefits, and trigger events are known. Group agreements posted may be associated with an individual group account balance (indicated by a capital "B"). Group agreement G may be associated with a group account balance, $B_G$, in block 1.

Additionally, block 2 includes three transactions (indicated by a capital "T"): a first transaction from user i to user I, a second transaction from user j to user m, and a third transaction from user k to user n. In some implementations, based on the contents of the blocks, any user of blockchain 117a may determine the current assets of blockchain 117a. For example, an individual user may not be allowed to transfer more assets than the individual user owns.

For example, the first transaction may represent a purchase of a first digital asset by user I, the second transaction may represent a purchase of a second digital asset by user m, and the third transaction may represent a purchase of a third digital asset by user n. The second transaction may represent a purchase of a particular digital asset from user j ($U_j$) by user m ($U_m$). For example, the particular digital asset of the second transaction in block 2 may be the particular game asset related to asset $A_y$ (i.e., related and/or corresponding to the distribution right). As a result of the second transaction in block 2, user j ($U_j$) may receive and contribute a portion resulting from the second transaction to group account balance $B_G$ in block 2, in accordance with smart contract 41. In some implementations, the portion may be sent and/or otherwise transferred to smart contract 41, and smart contract 41 may be configured to transfer that portion to group account balance $B_G$.

FIG. 4B illustrates a blockchain 117b that includes the same blocks as blockchain 117a of FIG. 4A, plus additional blocks (block 3, block 4) that have been appended to the blockchain. Block 3 may be connected to block 2 (as indicated by a link 30c), and block 4 may be connected to block 3 (as indicated by a link 30d). Block 3 includes a transaction (indicated by a capital "T"): a first transaction from user j to group account balance $B_G$ responsive to the second transaction in FIG. 4A.

In block 4, upon occurrence of at least one trigger event as defined by $C_G$, sharing of allocations of benefits may be executed (indicated by a capital "S"). For example, group account balance BG may be evenly divided and allocated amongst user i, user j, and user k.

Referring to FIG. 1, agreement interfaces 125 may be configured to facilitate interaction between users 123 and system 100 and/or between users 123 and client computing platforms 104. For example, agreement interfaces 125 may provide an interface through which users 123 may provide information to and/or receive information from system 100. In some implementations, agreement interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other agreement interface devices configured to receive and/or convey user input. In some implementations, one or more agreement interfaces 125 may be included in one or more client computing platforms 104. In some implementations, one or more agreement interfaces 125 may be included in system 100. In some implementations, agreement interface 125 may be a type of interface that facilitates defining and/or join the group agreements.

In some implementations, online gaming platform(s) 105, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which online gaming platform(s) 105, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 and 132*a* may be configured to execute components 118, 120, 122, 124, and/or 126; and 108 and/or 110, respectively, and/or other components. Processor(s) 132 and 132*a* may be configured to execute components 118, 120, 122, 124, and/or 126; and 108 and/or 110, respectively, and/or other components by software; hardware; firmware; some combination of software, hardware, and/or firmware; and/or other mechanisms for configuring processing capabilities on processor(s) 132 and 132*a*. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 118, 120, 122, 124, and/or 126 are illustrated in FIG. 1 as being implemented within a single processing unit, in implementations in which processor(s) 132 and 132*a* includes multiple processing units, one or more of components 108, 110, 118, 120, 122, 124, and/or 126 may be implemented remotely from the other components. The description of the functionality provided by the different components 108, 110, 118, 120, 122, 124, and/or 126 described below is for illustrative purposes, and is not intended to be limiting, as any of components 108, 110, 118, 120, 122, 124, and/or 126 may provide more or less functionality than is described. For example, one or more of components 108, 110; or 118, 120, 122, 124, and/or 126 may be eliminated, and some or all of its functionality may be provided by other ones of components 108, 110; 118, 120, 122, 124, and/or 126, respectively. As another example, processor(s) 132 and 132*a* may be configured to execute one or more additional components that may perform some or all of the functionality attributed below to one of components 108, 110, 118, 120, 122, 124, and/or 126.

Figure 2:
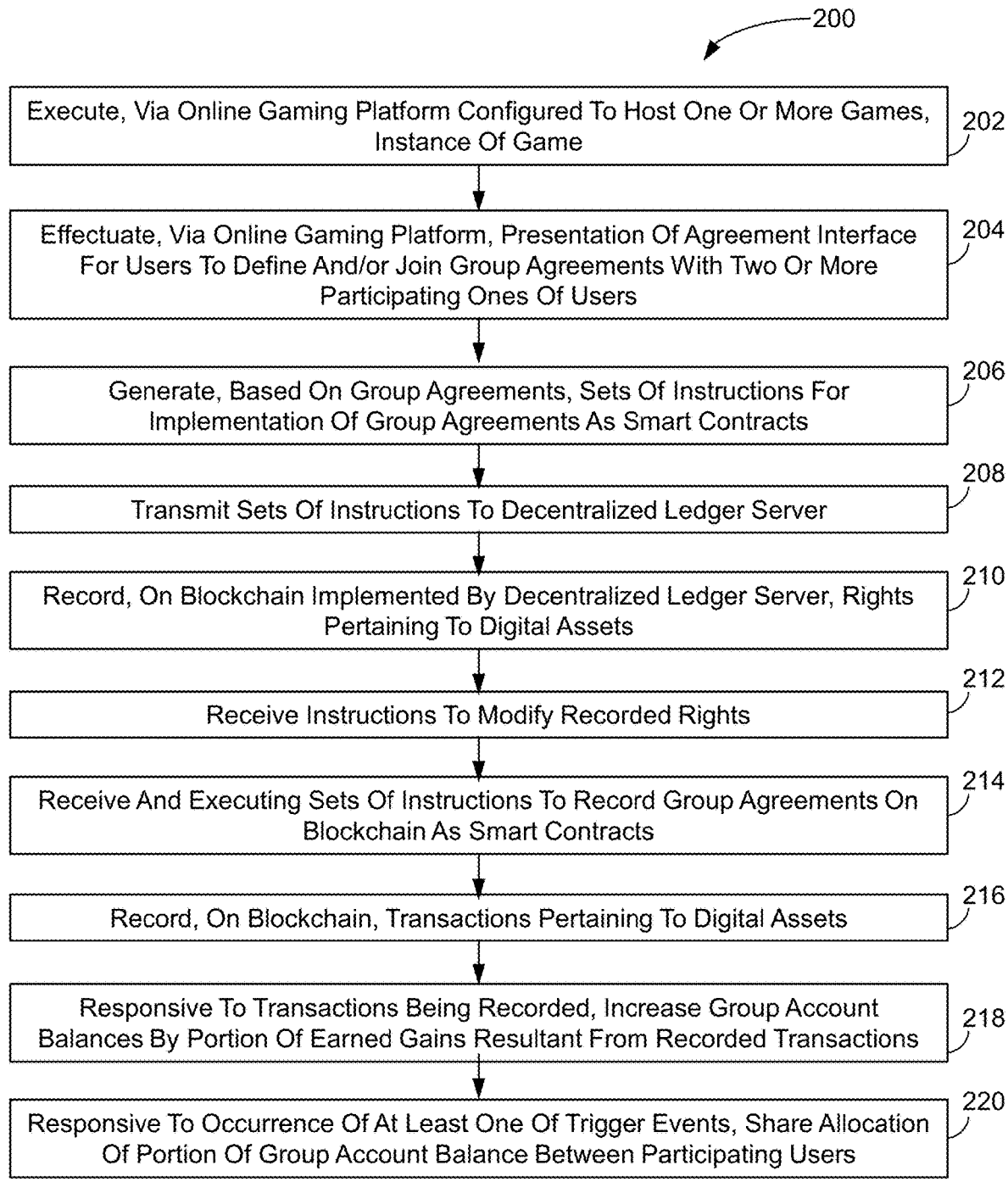
FIG. 2 illustrates a method to provide sharing of benefits amongst a group of users based on gains from distribution rights pertaining to digital assets, in accordance with one or more implementations.

FIG. 2 illustrates a method 200 to provide sharing of benefits amongst a group of users based on gains from distribution rights pertaining to digital assets, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include executing, via an online gaming platform configured to host one or more games, an instance of a game. Operation 202 may be performed by one or more hardware processors configured by machine-readable instructions including a component that is the same as or similar to game component 108, in accordance with one or more implementations.

An operation 204 may include effectuating, via the online gaming platform, presentation of an agreement interface for the users to define and/or join group agreements with two or more participating ones of the users. Operation 204 may be performed by one or more hardware processors configured by machine-readable instructions including a component that is the same as or similar to group agreement component 110, in accordance with one or more implementations.

An operation 206 may include generating, based on the group agreements, sets of instructions for implementation of the group agreements as smart contracts. Operation 206 may be performed by one or more hardware processors configured by machine-readable instructions including a component that is the same as or similar to group agreement component 110, in accordance with one or more implementations.

An operation 208 may include transmitting the sets of instructions to a decentralized ledger server. Operation 208 may be performed by one or more hardware processors configured by machine-readable instructions including a component that is the same as or similar to group agreement component 110, in accordance with one or more implementations.

An operation 210 may include recording, on a blockchain implemented by the decentralized ledger server, rights pertaining to digital assets. Operation 210 may be performed by one or more hardware processors configured by machine-readable instructions including a component that is the same as or similar to rights component 118, in accordance with one or more implementations.

An operation 212 may include receiving instructions to modify the recorded rights. Operation 212 may be performed by one or more hardware processors configured by machine-readable instructions including a component that is the same as or similar to instructions component 120, in accordance with one or more implementations.

An operation 214 may include receiving and executing the sets of instructions to record the group agreements on the blockchain as the smart contracts. The group agreements specify the participating users in the group agreements and further specify trigger events that may cause execution of the sharing of the future allocation of the benefits. Operation 214 may be performed by one or more hardware processors configured by machine-readable instructions including a component that is the same as or similar to instructions component 120, in accordance with one or more implementations.

An operation 216 may include recording, on the blockchain, transactions pertaining to the digital assets. The transactions result in gains based on the ownership of the distribution rights of the digital assets. Operation 216 may be performed by one or more hardware processors configured by machine-readable instructions including a component that is the same as or similar to transaction recording component 122, in accordance with one or more implementations.

An operation 218 may include responsive to the transactions being recorded, increasing the group account balances by a portion of the earned gains resultant from the recorded transactions. Operation 218 may be performed by one or more hardware processors configured by machine-readable instructions including a component that is the same as or similar to group balance component 124, in accordance with one or more implementations.

An operation 220 may include responsive to an occurrence of at least one of the trigger events specified for the group agreements, share an allocation of a portion of the first group account balance between the participating users. Operation 220 may be performed by one or more hardware processors configured by machine-readable instructions including a component that is the same as or similar to benefit allocation component 126, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A benefit sharing system comprising an online gaming platform and a ledger server,
wherein the online gaming platform comprises:
  a game component;
  a group agreement component;
  a gaming platform processor; and
  a first non-transitory memory containing first instructions, wherein the first instructions, when executed by the gaming platform processor, cause the gaming platform processor to perform the steps of:
    executing, by the game component, an instance of a game, wherein execution of the instance of the game facilitates presentation of the game to users;
    executing, by the game component, in-game actions in the instance of the game in response to action requests for the in-game actions by the users, wherein the users include a first user and a second user;
    presenting, by the group agreement component, an agreement interface that displays the group agreements between two or more participating ones of the users, wherein the group agreements include a first group agreement, wherein the two or more participating ones of the users:
      (i) contribute future gains to group account balances associated with individual ones of the group agreements, wherein the future gains that will be contributed to the group account balances are associated with particular digital assets, and
      (ii) share a future allocation of benefits, wherein sharing of the future allocation of the benefits includes at least a portion of the group account balances;
    receiving, by the group agreement component, user input from the group agreement component, through the agreement interface, wherein the user input indicates the first user and the second user have joined the first group agreement, and wherein the first group agreement is associated with a first group account balance;
    generating, by the group agreement component, sets of instructions for implementation of the group agreements as smart contracts, wherein the sets of instructions are based on the group agreements; and
    transmitting, by the group agreement component, the sets of instructions to a decentralized ledger server; and
wherein the ledger server comprises:
  a rights component;
  a group balance component;
  an instructions component;
  a benefit allocation component;
  a ledger server processor; and
  a second non-transitory memory containing second instructions, wherein the second instructions, when executed by the ledger server processor, causes the ledger server processor to perform the steps of:
    recording, by the rights component, rights pertaining to digital assets, wherein the recorded rights include:
      (i) ownership rights of digital assets, and
      (ii) distribution rights of digital assets that reflect rights held by the individual ones of the users to certain distributions of benefits upon exchanges involving the particular digital assets such that a first distribution right for a first digital asset is owned by the first user and a second distribution right for a second digital asset is owned by the second user, wherein the ownership rights of the digital assets are recorded separately from ownership of the distribution rights of the digital assets;
    receiving, by the instructions component, the sets of instructions to record the group agreements on the blockchain as the smart contracts, wherein the group agreements specify the participating users in the group agreements and further specify a pre-determined time for execution of the sharing of the future allocation of the benefits, wherein the group agreements as received include the first group agreement;

executing, by the instructions component, the sets of instructions to record the group agreements on the blockchain as the smart contracts;

recording, by the rights component, transactions pertaining to the digital assets, wherein the transactions result in gains based on the ownership of the distribution rights of the digital assets such that a first transaction pertaining to the first digital asset is recorded and the first user earns a first gain based on owning the first distribution rights;

increasing, by the group balance component, the group account balances by a portion of the gains earned from the transactions such that the first gain increases the first group account balance associated with the first group agreement; and sharing, by the benefit allocation component, an allocation of a portion of the first group account balance between the first user and the second user such that the allocation of the portion of the first group account balance reduces the first group account balance.

2. The system of claim 1, wherein responsive to a second transaction pertaining to the first digital asset being recorded and the first user earning a second gain based on owning the first distribution rights, the steps further include increasing, by the group balance component, the first group account balance by a portion of the second gain.

3. The system of claim 1, wherein the execution of the sharing of the future allocations of the benefits includes a determination by a smart contract of individual allocations that are shared with the participating users, wherein the individual allocations are individually determined portions of the group account balance.

4. The system of claim 3, wherein the allocation shared is based on the gains contributed to the group account balance by the individual participating users, time spent on the online gaming platform, progress within the game, damage done to another digital asset, victory within the game, and/or contribution to a goal of the individual participating users.

5. The system of claim 3, wherein the allocation shared is determined by evenly dividing, by the benefit allocation component, the group account balance amongst the participating users in accordance with the smart contract.

6. The system of claim 1, wherein sharing, by the benefit allocation component, the allocation of the portion of the first group account balance occurs repeatedly at a reoccurring predefined time.

7. The system of claim 1, wherein the transactions may be responsive to in-game victories and/or the in-game actions.

8. The system of claim 1, wherein the portion of the earned gains that increases the group account balances is predefined by the individual group agreement or the online gaming platform.

9. The system of claim 8, wherein the portion of the earned gains that increases the group account balances is specific to individual ones of the participating users.

10. The system of claim 1, wherein the gains include virtual currency and/or virtual points.

11. A method to use group agreements between users of an online gaming platform, the method comprising:

executing, by a game component that is included in the online gaming platform, an instance of a game to facilitate presentation of the game to the users, and implementing, by the game component, in-game actions in the instance of the game in response to action requests for the in-game actions by the users, wherein the users include a first user and a second user;

presenting, by a group agreement component that is included in the online gaming platform, an agreement interface that displays the group agreements between two or more participating ones of the users, wherein the group agreements include a first group agreement, wherein the two or more participating ones of the users:
(i) contribute future gains to group account balances associated with individual ones of the group agreements, wherein the future gains that will be contributed to the group account balances are associated with particular digital assets, and
(ii) share a future allocation of benefits, wherein sharing of the future allocation of the benefits includes at least a portion of the group account balances;

receiving, by the group agreement component, user input from the group agreement component, through the agreement interface, wherein the user input indicates the first user and the second user have joined the first group agreement, and wherein the first group agreement is associated with a first group account balance;

generating, by the group agreement component, sets of instructions for implementation of the group agreements as smart contracts, wherein the sets of instructions are based on the group agreements;

transmitting, by the group agreement component, the sets of instructions to a decentralized ledger server;

recording, by a rights component that is included in the decentralized ledger server, rights pertaining to digital assets, wherein the rights are recorded on a blockchain implemented by the decentralized ledger server, wherein the recorded rights include:
(i) ownership rights of digital assets, and
(ii) distribution rights of digital assets that reflect rights held by the individual ones of the users to certain distributions of benefits upon exchanges involving the particular digital assets such a first distribution right for a first digital asset is owned by the first user and a second distribution right fora second digital asset is owned by the second user, wherein the owners hip rights of the digital assets are recorded separately from owners hip of the distribution rights of the digital assets;

receiving and executing, by an instructions component that is included in the decentralized ledger server, the sets of instructions to record the group agreements on the blockchain as the smart contracts, wherein the group agreements specify the participating users in the group agreements and further specify a pre-determined time for execution of the sharing of the future allocation of the benefits, wherein the group agreements as received include the first group agreement;

recording, by the rights component, transactions pertaining to the digital assets wherein the transactions are recorded on the blockchain, wherein the transactions result in gains based on the ownership of the distribution rights of the digital assets such that a first transaction pertaining to the first digital asset is recorded and the first user earns a first gain based on owning the first distribution rights;

increasing, by a group balance component that is included in the decentralized server, the group account balances by a portion of the gains earned from the transactions such that the first gain increases the first group account balance associated with the first group agreement; and sharing, by a benefit allocation component that is included in the decentralized server, an allocation of a portion of the first group account balance between the first user and the second user such that the allocation of the portion of the first group account balance reduces the first group account balance.

12. The method of claim 11, wherein responsive to a second transaction pertaining to the first digital asset being recorded and the first user earning a second gain based on owning the first distribution rights, further comprising increasing, by the group balance component, the first group account balance by a portion of the second gain.

13. The method of claim 11, wherein the execution of the sharing of the future allocations of the benefits includes a determination by a smart contract of individual allocations that are shared with the participating users, wherein the individual allocations are individually determined portions of the group account balance.

14. The method of claim 13, wherein the allocation shared is based on the gains contributed to the group account balance by the individual participating users, time spent on the online gaming platform, progress within the game, damage done to another digital asset, victory within the game, and/or contribution to a goal of the individual participating users.

15. The method of claim 13, wherein the allocation shared is determined by evenly dividing, by the benefit allocation component, the group account balance amongst the participating users in accordance with the smart contract.

16. The method of claim 11, wherein sharing, by the benefit allocation component, the allocation of the portion of the first group account balance occurs repeatedly at a reoccurring predefined time.

17. The method of claim 11, wherein the transactions may be responsive to in-game victories and/or the in-game actions.

18. The method of claim 11, wherein the portion of the earned gains that increases the group account balances is predefined by the individual group agreement or the online gaming platform.

19. The method of claim 18, wherein the portion of the earned gains that increases the group account balances is specific to individual ones of the participating users.

20. The method of claim 11, wherein the gains include virtual currency and/or virtual points.

* * * * *

UNITED STATES PATENT AND TRADEMARK OFFICE
CERTIFICATE OF CORRECTION

| | |
|---|---|
| PATENT NO. | : 11,288,759 B1 |
| APPLICATION NO. | : 17/150242 |
| DATED | : March 29, 2022 |
| INVENTOR(S) | : John Linden |

It is certified that error appears in the above-identified patent and that said Letters Patent is hereby corrected as shown below:

In the Claims

In Claim 11, Column 22, Line 41 please delete "fora" and insert --for a--, therefor.

In Claim 11, Column 22, Line 43 please delete "owners hip" and insert --ownership--, therefor.

In Claim 11, Column 22, Line 44 please delete "owners hip" and insert --ownership--, therefor.

Signed and Sealed this
Twentieth Day of September, 2022

*Katherine Kelly Vidal*

Katherine Kelly Vidal
*Director of the United States Patent and Trademark Office*